United States Patent
Mittal et al.

(10) Patent No.: US 10,742,244 B1
(45) Date of Patent: Aug. 11, 2020

(54) IMPEDANCE MATCHED SWITCH

(71) Applicant: QUALCOMM Incorporated, San Diego, CA (US)

(72) Inventors: Ayush Mittal, Bangalore (IN); Arnab Chakraborty, Bangalore (IN); Krishnaswamy Thiagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/702,366

(22) Filed: Dec. 3, 2019

(51) Int. Cl.
*H04B 1/04* (2006.01)

(52) U.S. Cl.
CPC .................. *H04B 1/0483* (2013.01)

(58) Field of Classification Search
CPC ....... H04B 1/0483; H04B 1/04; H04B 1/0458
See application file for complete search history.

(56) References Cited

U.S. PATENT DOCUMENTS

| 2011/0158297 A1* | 6/2011 | Ding | H03D 3/009 375/219 |
| 2014/0098906 A1* | 4/2014 | Gudem | H04B 7/02 375/297 |

* cited by examiner

*Primary Examiner* — Nguyen T Vo
(74) *Attorney, Agent, or Firm* — Qualcomm Incorporated/Seyfarth Shaw LLP (57) ABSTRACT

A device has a first switch in a first transmit path coupled between an output of a first DAC (digital-to-analog converter) in the first transmit path and an input of a first baseband filter in the first transmit path. The device also includes a second switch coupled between the output of the first DAC and an input of a second baseband filter in a second transmit path. The second switch is permanently open. The device also has a third switch and a fourth switch. The third switch is coupled between an output of a second DAC in the second transmit path and the input of the second baseband filter. The fourth switch is coupled between the output of the second DAC and the input of the first baseband filter.

12 Claims, 9 Drawing Sheets

IMPEDANCE MATCHED SWITCH

TECHNICAL FIELD

The present disclosure generally relates to wireless transmitters. More specifically, the present disclosure relates to an impedance matched switch to drive in-phase/quadrature phase transmit filters.

BACKGROUND

Wireless communications systems are widely deployed to provide various types of communications content such as voice, data, and so on. These systems may be multiple-access systems capable of supporting communications with multiple users by sharing the available system resources (e.g., bandwidth and transmit power). Examples of such multiple-access systems include, without limitation, third generation partnership project (3GPP) technologies (e.g., third generation technology (3G), fourth generation technology (4G) or long term evolution (LTE), and fifth generation technology (5G)), millimeter wave (mmW) technology (extremely high frequency (EHF)), Bluetooth technology, and Wi-Fi technology. In a millimeter wave (mmW) system, multiple antennas are used for beamforming (e.g., in the range of 30 gigahertz (GHz), 60 GHz, etc.).

In a communications system, a transmitter may process (e.g., encode and modulate) data. The transmitter may further condition (e.g., convert to analog, filter, frequency up-convert to radio frequency (RF), and amplify) the data to generate an output RF signal. The transmitter may then transmit the output RF signal via a communications channel to a receiver. The receiver may receive the transmitted RF signal and perform the complementary processing on the received RF signal. The receiver may condition (e.g., amplify, frequency down-convert to baseband, filter, and digitize) the received RF signal to obtain input samples. The receiver may further process (e.g., demodulate and decode) the input samples to recover the transmitted data.

SUMMARY

According to the present disclosure, a device has a first switch in a first transmit path coupled between an output of a first DAC (digital-to-analog converter) in the first transmit path and an input of a first baseband filter in the first transmit path. The device also includes a second switch coupled between the output of the first DAC and an input of a second baseband filter in a second transmit path. The second switch is permanently open. The device further includes a third switch coupled between an output of a second DAC in the second transmit path and the input of the second baseband filter. The device also has a fourth switch coupled between the output of the second DAC and the input of the first baseband filter.

In another aspect of the present disclosure, a device has a first transmit path and a second transmit path. The first transmit path comprises a first baseband filter, and a first DAC (digital to analog converter) coupled to an input of the first baseband filter. The second transmit path comprises a second baseband filter, and a second DAC coupled to an input of the second baseband filter. The device also includes a mode switch device coupled between an output of the first DAC and the input of the first baseband filter and between an output of the second DAC and the input of the second baseband filter. The mode switch device comprises a first switch, a second switch, a third switch, and a fourth switch.

The first switch is coupled between the output of the first DAC and the input of the first baseband filter. The second switch is coupled between the output of the first DAC and the input of the second baseband filter. The second switch is permanently open. The third switch is coupled between the output of the second DAC and the input of the second baseband filter. The fourth switch is coupled between the output of the second DAC and the input of the first baseband filter.

In yet another aspect of the present disclosure, a method prevents flow of charge between a first DAC (digital-to-analog converter) in a first transmit path and a second baseband filter in a second transmit path with a permanently open switch coupled between an output of the first DAC and an input of the second baseband filter. The method also selectively couples an output of a second DAC in the second transmit path to each of an input of a first baseband filter in the first transmit path and an input of the second baseband filter when operating in a first mode.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

A wireless device (e.g., a cellular phone or a smartphone) in a wireless communications system may transmit and receive data for two-way communications. The wireless device may include a transmitter for data transmission and a receiver for data reception. For data transmission, the transmitter may modulate a radio frequency (RF) carrier signal with data to obtain a modulated RF signal, amplify the modulated RF signal to obtain an amplified RF signal having the proper output power level, and transmit the amplified RF signal via an antenna to a base station.

In RF applications, a local oscillator (LO) input signal is mixed with another input signal at a mixer to achieve frequency translation, which is generally called up-conversion or down-conversion. During up-conversion, an input baseband signal is up-converted to an RF signal. During down-conversion, the input RF signal is down-converted to a baseband signal. The baseband signal is a complex valued signal that includes an in-phase (I) and a quadrature-phase (Q) signal. For example, in-phase and quadrature refer to two sinusoids that have the same frequency and are ninety degrees (90°) out of phase. Some transmitters use two digital-to-analog converters (DACs) for generating the I and Q baseband signals. For example, these transmitters use a first DAC (I-DAC) for in-phase signals and a second DAC (Q-DAC) for quadrature signals.

In some modes of operation of a wireless communications system (e.g., long term evolution (LTE) mode), a modem drives signal current into both in-phase (I) and quadrature phase (Q) baseband filters (BBFs). In other modes of operation of the wireless communications system (e.g., global system for mobile communications (GSM) mode or an enhanced data rates for GSM evolution (EDGE) mode) power savings may be desired, or the modem may have certain limitations. Thus, the I-DAC can be set to have high impedance, not driving any signal current. In this mode of operation (e.g., GSM/EDGE mode) only the Q-DAC is enabled to drive signal current. Thus, a switch configuration is specified to route a signal current from the Q-DAC to both the I and Q baseband filters.

To get a same charge (e.g., voltage) swing at both outputs of the I and Q baseband filters when operating in the GSM/EDGE mode, the signal current from the Q-DAC should see or be subject to an equal impedance for both the I and Q baseband filters. When the signal current is subject to an equal impedance, the operation is optimized because the signal current splits equally between the I and Q transmit signal paths. However, conventional implementations fail to achieve equal impedance at both the I and Q baseband filters.

To improve performance of the wireless communications system, an off-capacitance of switches in the switch configuration should cause equal loading on nodes or pillars coupled to or at the inputs of the I and Q baseband filters. The pillars or nodes may include an I baseband filter input pillar in an I transmit signal path and a Q baseband filter input pillar in a Q transmit signal path. In one aspect, the I baseband filter input pillar is between the output of the I-DAC and the input of the I baseband filter. The Q baseband filter input pillar is between the output of the Q-DAC and the input of the Q baseband filter. For example, the pillar may be a copper pillar, a pin of a chip package (e.g., a modem chip package) through which multiple packages are connected or coupled, or a solder bump (e.g., an under-bump-metallization (UBM)) introduced on a chip bond pad (e.g., a modem chip). The equal loading at the nodes or pillars is specified to avoid gain and phase mismatch between I and Q channels of the transmit path in some modes of operation (e.g., LTE mode). However, conventional implementations fail to achieve equal loading.

Some implementations short the I and Q baseband filter input pillars directly through a switch. For example, the switch configuration for this implementation may include a first switch between the I baseband filter input pillar and the I baseband filter of the I transmit signal path, a second switch between the Q baseband filter input pillar and the Q baseband filter of the Q transmit signal path, and a third switch between the I transmit signal path and the Q transmit signal path. One terminal of the third switch may be between the I baseband filter input pillar and the first switch and another terminal between the Q baseband filter input pillar and the second switch.

However, in the GSM/EDGE mode, when the I-DAC has high impedance and does not drive any signal current, the signal current from the Q baseband filter input pillar sees or is subject to two switches (e.g., the first and the third switches) in series toward an input of the I baseband filter. The signal current from the Q baseband filter input pillar sees or is subject to only one switch (e.g., the second switch) toward an input of the Q baseband filter. This impedance mismatch, due to the mismatch in the switches, causes more signal current to flow through the Q transmit signal path causing large charge (e.g., voltage) swing differences between outputs of the I and Q baseband filters.

Other existing implementations utilize an impedance matched solution where the Q baseband filter input pillar is shorted with the input of the I baseband filter, instead of shorting the I and Q baseband filter input pillars directly, as in the previous solution. In the GSM/EDGE mode, when the I-DAC has high impedance and does not drive any signal current, the signal current from the Q baseband filter input pillar now sees only one switch impedance, from an IQ short switch, to each of the inputs of the I and Q baseband filters. For example, a first terminal of the IQ short switch is between the first switch and the I baseband filter in the I transmit signal path. The first switch is after the I baseband filter input pillar. However, the Q baseband filter input pillar in the impedance matched solution is subject to extra loading caused by the IQ short switch.

Aspects of the present disclosure are directed to improving voltage swing differences at the outputs of the I and Q baseband filters (e.g., when operating in accordance with the GSM/EDGE mode). The aspects of the present disclosure also improve loading in the Q baseband filter input pillar (e.g., when operating in accordance with the GSM/EDGE mode).

In one aspect, a wireless device, such as a user equipment, includes a first transmit path and a second transmit path. The first transmit path includes a first baseband filter and a first DAC (digital-to-analog converter) coupled to an input of the first baseband filter. The second transmit path includes a second baseband filter and a second DAC coupled to an input of the second baseband filter. The wireless device also includes an input mode switch device or input switch matrix coupled between an output of the first DAC and the input of the first baseband filter, and between an output of the second DAC and the input of the second baseband filter. The first DAC can be an in-phase DAC (I-DAC) and the first baseband filter can be an in-phase baseband filter. The second DAC can be a quadrature DAC (Q-DAC) and the second baseband filter can be a quadrature baseband filter.

The input mode switch device includes a first switch (e.g., a first main switch) coupled between the I baseband filter input pillar and the input of the first baseband filter or coupled between the output of a first/I-DAC and the input of the first/I baseband filter. The input mode switch device also includes a second switch (e.g., a second main switch) coupled between the output of the second/Q-DAC and the input of the second baseband filter, or coupled between the Q baseband filter input pillar and the input of the second baseband filter.

The input mode switch device further includes a third switch coupled between the output of the second DAC and the input of the first baseband filter, or coupled between the Q baseband filter input pillar and the input of the first baseband filter. The first switch, the second switch, and the third switch selectively couple the first DAC and/or the second DAC to the first baseband filter and/or the second baseband filter based on the mode of operation.

The input mode switch device further includes a fourth switch coupled between the I baseband filter input pillar and the input of the second/Q baseband filter, or coupled between the output of the first DAC and the input of the second baseband filter. In one aspect, the fourth switch is a dummy switch that is permanently open. For example, the dummy switch is always open or disabled and serves to match the loading of the I and Q baseband filter input pillars or the I-DAC and Q-DAC. Thus, the dummy switch prevents flow of charge (voltage or current) between the output of the first DAC or the I baseband filter input pillar and the input of the second baseband filter (or vice versa).

When operating in LTE mode, only the main switches (e.g., the first switch and the second switch) are turned on and/or enabled while the second and the fourth switches are turned off and/or disabled. For example, the first switch is turned on and/or enabled to short the I transmit signal path, which traverses from the first DAC or from the I baseband filter input pillar to the first baseband filter. The second switch is turned on and/or enabled to short the Q transmit signal path, which traverses from the second DAC or from the Q baseband filter input pillar to the second baseband filter. In LTE mode, the third switch is open to prevent charge from flowing from the Q baseband filter input pillar or the second DAC to the first baseband filter.

When operating in the GSM/EDGE mode, the I-DAC has high impedance and does not drive any signal current. The I-DAC is therefore disabled. Thus, the signals to the Q baseband filter and the I baseband filter are driven from the Q-DAC, which is enabled. The input mode switch device selectively couples an output of a second DAC to each of an input of the first baseband filter and an input of the second baseband filter when operating in the GSM/EDGE mode. The first switch, the second switch, and the third switch of the input mode switch device are utilized to drive the signal to the Q baseband filter and the I baseband filter from the Q-DAC.

For example, in the GSM/EDGE mode, the first switch is disabled because the I-DAC cannot drive a signal to the first or the second baseband filter. The third switch is turned on to short the Q transmit signal path, which traverses from the second DAC or from the Q baseband filter input pillar to the second baseband filter. The fourth switch is turned on to short an I and Q signal path (or cross path), which traverses from the second DAC or from the Q baseband filter input pillar to the first baseband filter.

In one aspect, the first transmit path and the second transmit path are differential paths. For example, each of the output of the first DAC and the second DAC are differential outputs. In addition, each of the inputs and the outputs of the first baseband filter and the second baseband filter include differential inputs and differential outputs. Accordingly, each of the first switch, the second switch, the third switch, and the fourth switch includes dual switches to accommodate the differential inputs and differential outputs.

The use of the dummy switch improves, reduces, or eliminates impedance mismatch of the load of the I and Q baseband filter input pillars or the load of the I-DAC and Q-DAC due to the mismatch in the switches. However, even when the I and Q baseband filters are impedance matched, mismatches between I and Q operational amplifiers of the I and Q baseband filters cause the input impedances to vary considerably, resulting in swing mismatches at the output of the I and Q baseband filters. To reduce the mismatches between the I and Q operational amplifiers of the I and Q baseband filters, another set of switches (e.g., an output mode switch device or output switch matrix) is used to short the outputs of the I and Q baseband filters.

In one aspect, the output mode switch device is enabled only in the GSM/EDGE mode. The output mode switch device can include an output switch having several MOSFETs connected in parallel, to reduce switch ON resistance. Half of these MOSFETs are placed close to the I baseband filter and the other half are placed close to the Q baseband filter. The arrangement of the output mode switch device equalizes the loading at the outputs of the I and Q baseband filters while optimizing available space for the placement of the switches.

Figure 1:
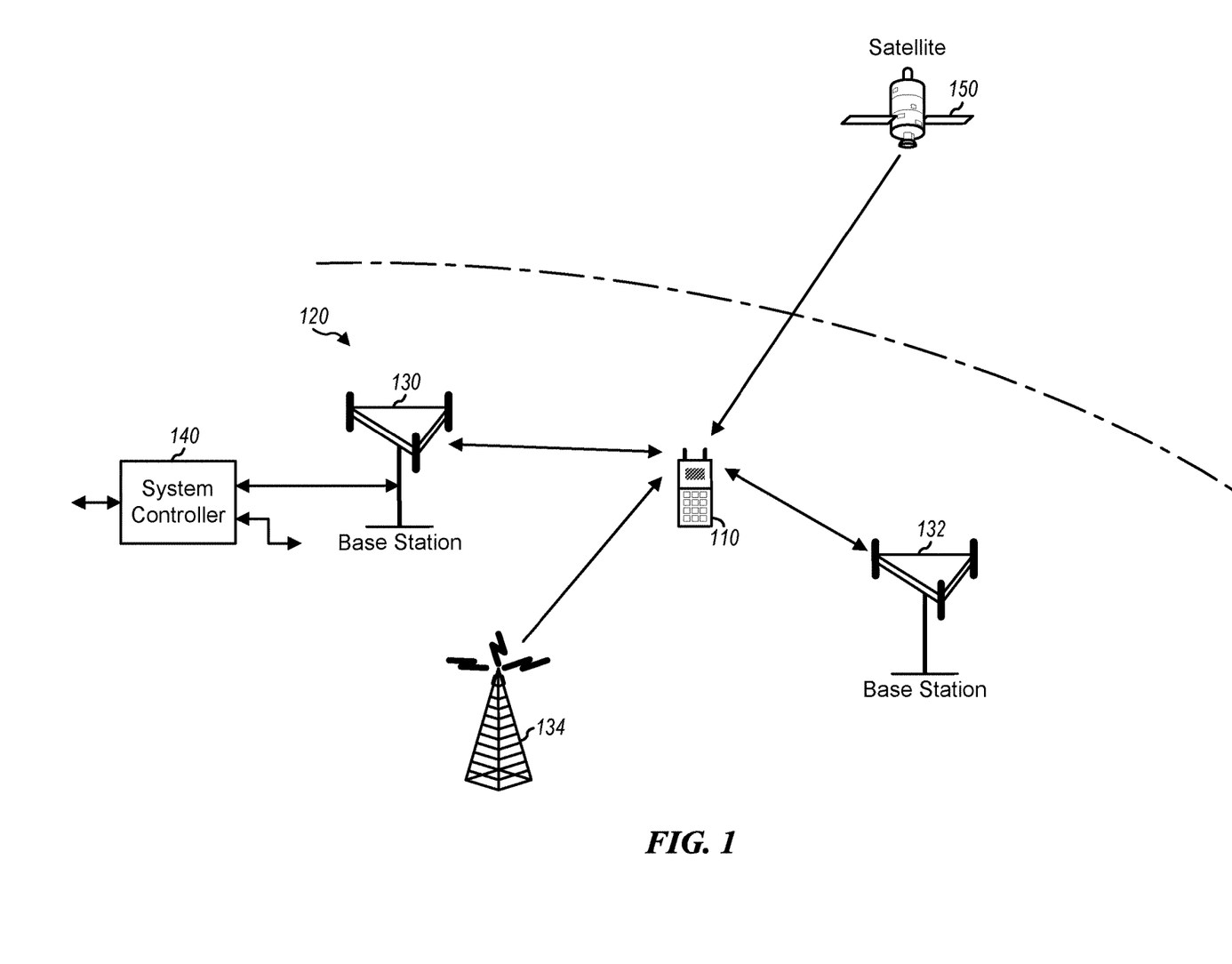
FIG. 1 shows a wireless device communicating with a wireless communications system.
Figure 9:
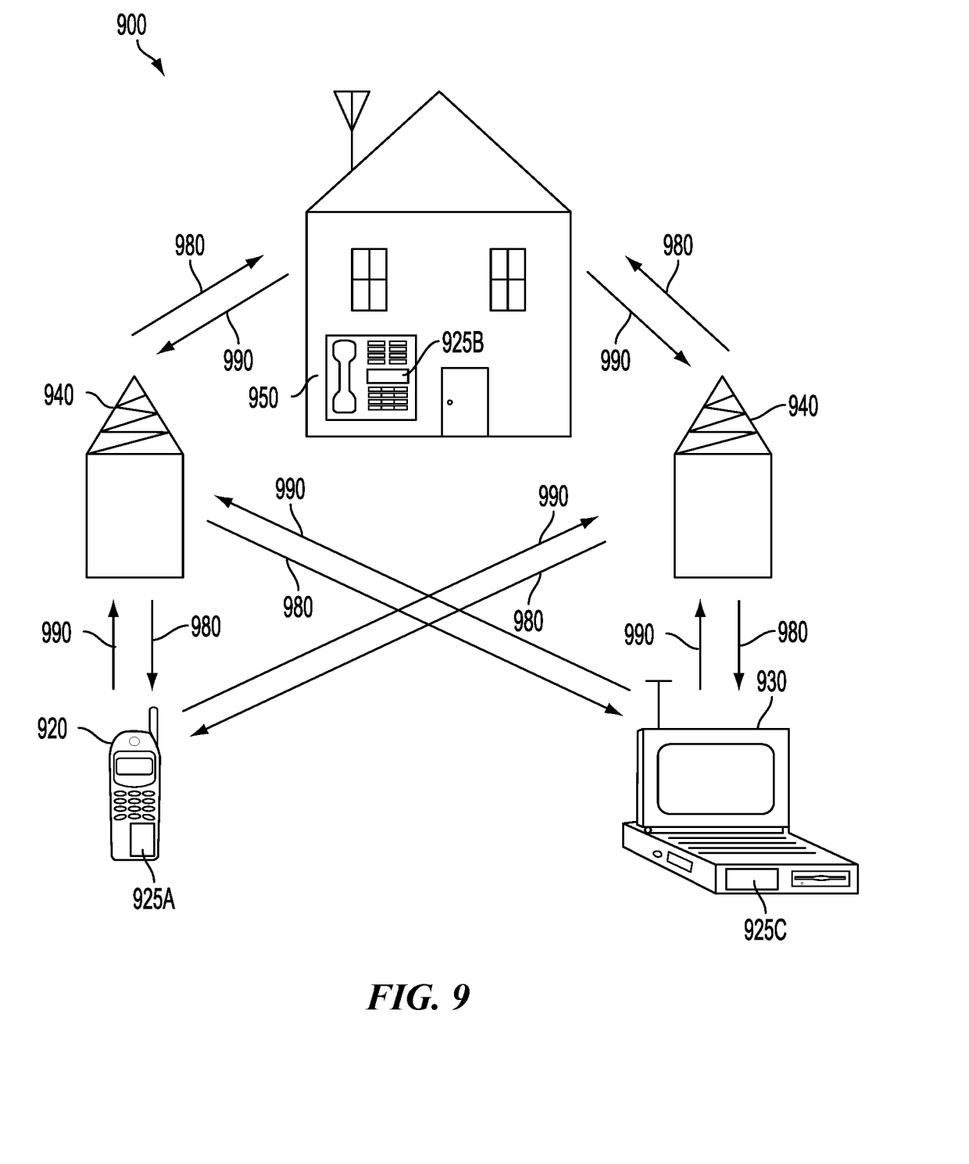
FIG. 9 is a block diagram showing an exemplary wireless communications system in which a configuration of the disclosure may be advantageously employed.

The aspects of the present disclosure may be implemented in the system of FIG. 1, and the system of FIG. 9. More specifically, aspects of the present disclosure may be implemented in the wireless device 110 of FIG. 1 or the wireless device 200 of FIG. 2.

FIG. 1 shows the wireless device 110 communicating with a wireless communications system 120. The wireless communications system 120 may be a 5G system, a long term evolution (LTE) system, a code division multiple access (CDMA) system, a global system for mobile communications (GSM) system, a wireless local area network (WLAN) system, or some other wireless system. A CDMA system may implement wideband CDMA (WCDMA), time division synchronous CDMA (TD-SCDMA), CDMA2000, or some other version of CDMA. For simplicity, FIG. 1 shows the wireless communications system 120 including two base stations 130 and 132 and one system controller 140. In general, a wireless system may include any number of base stations and any number of network entities.

A wireless device 110 may be referred to as a user equipment (UE), a mobile station, a terminal, an access terminal, a subscriber unit, a station, etc. The wireless device 110 may also be a cellular phone, a smartphone, a tablet, a wireless modem, a personal digital assistant (PDA), a handheld device, a laptop computer, a Smartbook, a netbook, a cordless phone, a wireless local loop (WLL) station, a Bluetooth device, etc. The wireless device 110 may be capable of communicating with the wireless communications system 120. The wireless device 110 may also be capable of receiving signals from broadcast stations (e.g., a broadcast station 134), signals from satellites (e.g., a satellite 150) in one or more global navigation satellite systems (GNSS), etc. The wireless device 110 may support one or more radio technologies for wireless communications such as 5G, LTE, CDMA2000, WCDMA, TD-SCDMA, GSM, 802.11, etc.

The wireless device 110 may support carrier aggregation, which is operation on multiple carriers. Carrier aggregation may also be referred to as multi-carrier operation. According to an aspect of the present disclosure, the wireless device 110 may be able to operate in low-band from 698 to 960 megahertz (MHz), mid-band from 1475 to 2170 MHz, and/or high-band from 2300 to 2690 MHz, ultra-high band from 3400 to 3800 MHz, and long term evolution (LTE) in LTE unlicensed bands (LTE-U/LAA) from 5150 MHz to 5950 MHz. Low-band, mid-band, high-band, ultra-high band, and LTE-U refer to five groups of bands (or band groups), with each band group including a number of frequency bands (or simply, "bands"). For example, in some systems each band may cover up to 200 MHz and may include one or more carriers. For example, each carrier may cover up to 40 MHz in LTE. Of course, the range for each of the bands is merely exemplary and not limiting, and other frequency ranges may be used. LTE Release 11 supports 35 bands, which are referred to as LTE/UMTS bands and are listed in 3GPP TS 36.101. The wireless device 110 may be configured with up to 5 carriers in one or two bands in LTE Release 11.

Figure 2:
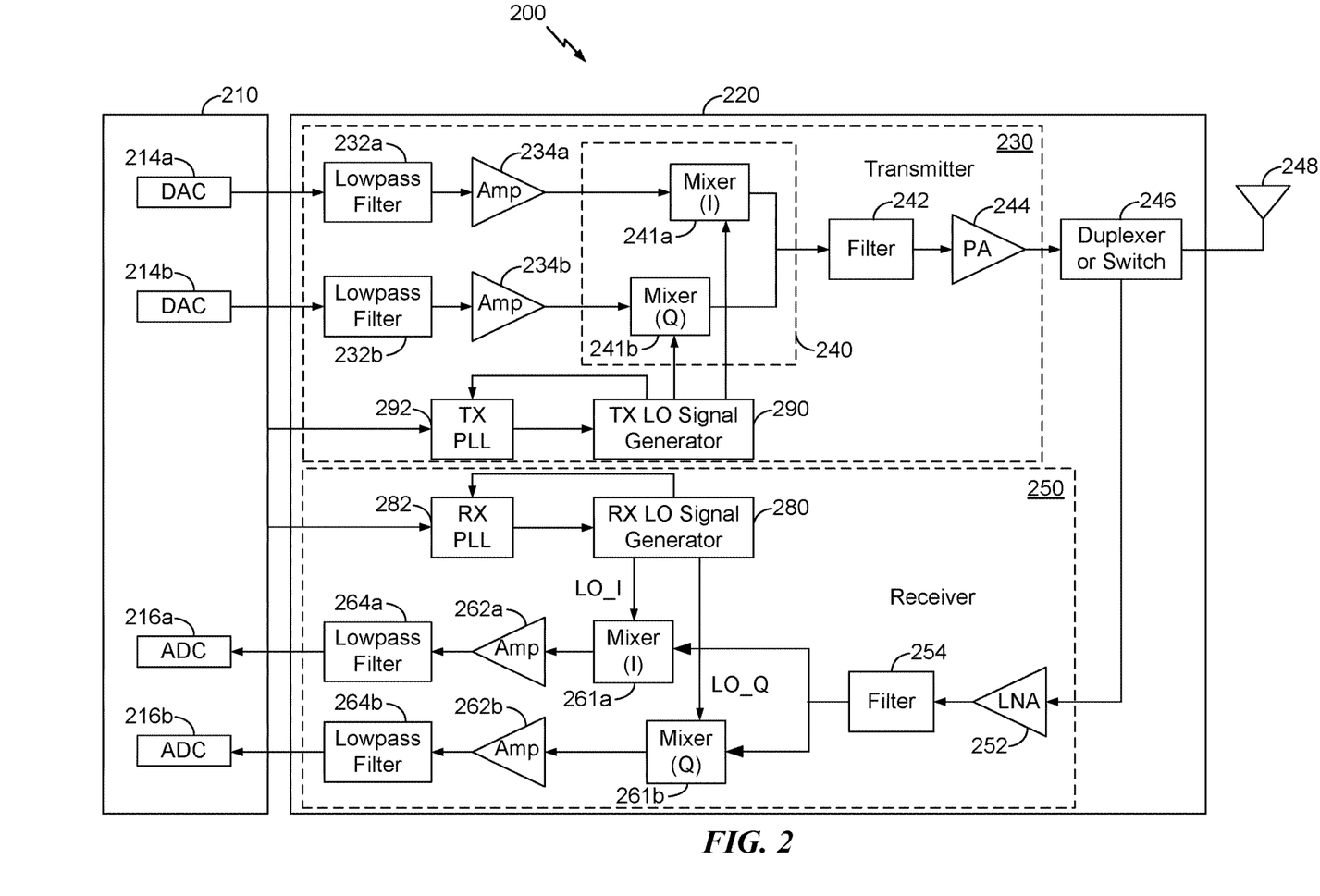
FIG. 2 shows a block diagram of the wireless device in FIG. 1, according to an aspect of the present disclosure.

FIG. 2 shows a block diagram of an exemplary design of a wireless device 200, such as the wireless device 110 shown in FIG. 1. FIG. 2 shows an example of a transceiver 220, which may be a wireless transceiver (WTR). In general, the conditioning of the signals in a transmitter 230 and a receiver 250 may be performed by one or more stages of amplifier(s), filter(s), up-converters, down-converters, and the like. These circuit blocks may be arranged differently from the configuration shown in FIG. 2. Furthermore, other circuit blocks not shown in FIG. 2 may also be used to condition the signals in the transmitter 230 and receiver 250. Unless otherwise noted, any signal in FIG. 2, or any other illustrations in the drawings, may be either single-ended or differential. Some circuit blocks in FIG. 2 may also be omitted.

In the example shown in FIG. 2, the wireless device 200 generally includes the transceiver 220 and a data processor 210. The data processor 210 may include a memory (not shown) to store data and program codes, and may generally include analog and digital processing elements. The transceiver 220 may include the transmitter 230 and receiver 250 that support bi-directional communications. In general, the wireless device 200 may include any number of transmitters and/or receivers for any number of communications systems and frequency bands. All or a portion of the transceiver 220 may be implemented on one or more analog integrated circuits (ICs), radio frequency (RF) integrated circuits (RFICs), mixed-signal ICs, and the like.

A transmitter or a receiver may be implemented with a super-heterodyne architecture or a direct-conversion architecture. In the super-heterodyne architecture, a signal is frequency-converted between radio frequency and baseband in multiple stages, e.g., from radio frequency to an intermediate frequency (IF) in one stage, and from intermediate frequency to baseband in another stage for a receiver. In the direct-conversion architecture, a signal is frequency-converted between radio frequency and baseband in one stage. The super-heterodyne and direct-conversion architectures may use different circuit blocks and/or have different requirements. In the example shown in FIG. 2, the transmitter 230 and the receiver 250 are implemented with the direct-conversion architecture.

In a transmit path, the data processor 210 processes data to be transmitted. The data processor 210 also provides in-phase (I) and quadrature (Q) analog output signals to the transmitter 230 in the transmit path. In an exemplary aspect, the data processor 210 includes digital-to-analog converters (DACs) 214a and 214b for converting digital signals generated by the data processor 210 into the in-phase (I) and quadrature (Q) analog output signals (e.g., I and Q output currents) for further processing.

Within the transmitter 230, lowpass filters 232a and 232b filter the in-phase (I) and quadrature (Q) analog transmit signals, respectively, to reduce undesired images caused by the prior digital-to-analog conversion. Amplifiers (Amp) 234a and 234b amplify the signals from lowpass filters 232a and 232b, respectively, and provide in-phase (I) and quadrature (Q) baseband signals. An up-converter 240 including up-conversion mixers 241a and 241b up-converts the in-phase (I) and quadrature (Q) baseband signals with in-phase (I) and quadrature (Q) transmit (TX) local oscillator (LO) signals from a TX LO signal generator 290 to provide an up-converted signal. A filter 242 filters the up-converted signal to reduce undesired images caused by the frequency up-conversion as well as interference in a receive frequency band. A power amplifier (PA) 244 amplifies the signal from filter 242 to obtain the desired output power level and provides a transmit radio frequency signal. The transmit radio frequency signal is routed through a duplexer/switch 246 and transmitted via an antenna 248.

In a receive path, the antenna 248 receives communications or wireless signals and provides a received radio frequency (RF) signal, which is routed through the duplexer/switch 246 and provided to a low noise amplifier (LNA) 252. The duplexer/switch 246 is designed to operate with a specific receive (RX) to transmit (TX) (RX-to-TX) duplexer frequency separation, such that RX signals are isolated from TX signals. The received RF signal is amplified by the LNA 252 and filtered by a filter 254 to obtain a desired RF input signal. Down-conversion mixers 261a and 261b mix the output of the filter 254 with in-phase (I) and quadrature (Q) receive (RX) LO signals (e.g., LO_I and LO_Q) from an RX LO signal generator 280 to generate in-phase (I) and quadrature (Q) baseband signals. The in-phase (I) and quadrature (Q) baseband signals are amplified by amplifiers 262a and 262b and further filtered by lowpass filters 264a and 264b to obtain in-phase (I) and quadrature (Q) analog input signals, which are provided to the data processor 210. In the exemplary configuration shown, the data processor 210 includes analog-to-digital converters (ADCs) 216a and 216b for converting the analog input signals into digital signals for further processing by the data processor 210.

In FIG. 2, the transmit local oscillator (TX LO) signal generator 290 generates the in-phase (I) and quadrature (Q) TX LO signals used for frequency up-conversion, while a receive local oscillator (RX LO) signal generator 280 generates the in-phase (I) and quadrature (Q) RX LO signals used for frequency down-conversion. Each LO signal is a periodic signal with a particular fundamental frequency. A phase locked loop (PLL) 292 receives timing information from the data processor 210 and generates a control signal used to adjust the frequency and/or phase of the TX LO signals from the TX LO signal generator 290. Similarly, a PLL 282 receives timing information from the data processor 210 and generates a control signal used to adjust the frequency and/or phase of the RX LO signals from the RX LO signal generator 280.

Figure 3:
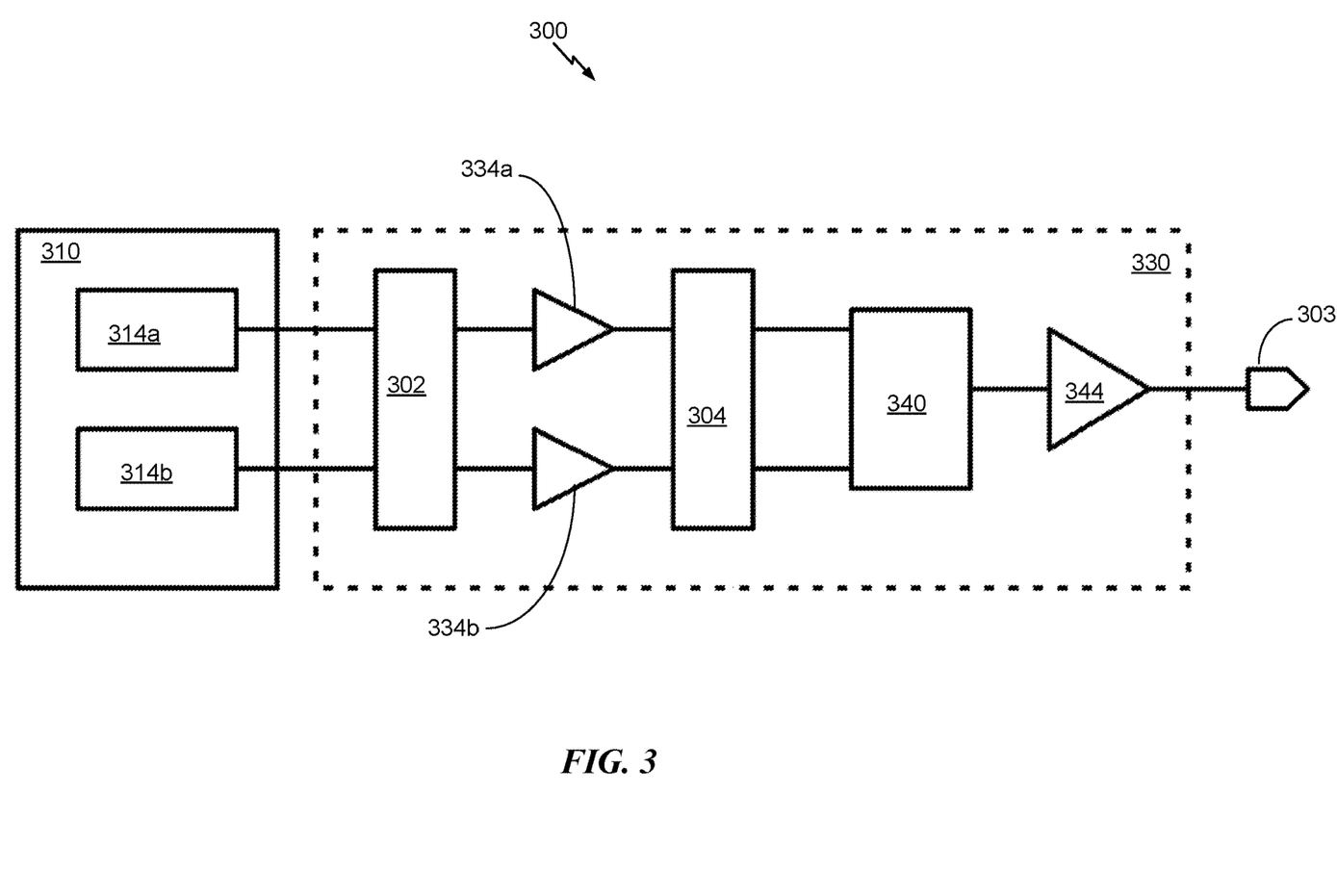
FIG. 3 shows a block diagram of an exemplary design of a wireless transmitter of a wireless device, according to aspects of the present disclosure.

FIG. 3 shows a block diagram of an exemplary design of a wireless transmitter 330 of a wireless device 300 (e.g., the wireless device 200, of FIG. 2), according to aspects of the present disclosure. A data processor 310 (e.g., a modem) processes data or signals to be transmitted through the wireless transmitter 330. The data processor 310 also provides in-phase (I) and quadrature (Q) analog output signals to the transmitter 330 in a transmit path. The data processor 310 includes digital-to-analog converters (DACs) 314a and 314b for converting digital signals generated by the data processor 310 into the in-phase (I) and quadrature (Q) analog output signals (e.g., I and Q output currents) for further processing. For example, the DAC 314a is an I-DAC and the DAC 314b is a Q-DAC.

Within the transmitter 330, I and Q baseband filters 334a and 334b filter the in-phase (I) and quadrature (Q) analog transmit signals, respectively. An up-converter 340 including up-conversion mixers up-converts the in-phase (I) and quadrature (Q) baseband signals with in-phase (I) and quadrature (Q) transmit (TX) local oscillator (LO) signals to provide an up-converted signal. An amplifier 344 (e.g., a power amplifier (PA)) amplifies the signal from the up-converter 340 to obtain the desired output power level and provides a transmit radio frequency signal at a transmit output 303.

The wireless transmitter further includes a first set of switches 302 (e.g., a first input mode switch device or input switch matrix) to drive the I and Q baseband filters 334a and 334b. To reduce mismatches between I and Q operational amplifiers of the I and Q baseband filters, a second set of switches 304 (e.g., output mode switch device or output switch matrix) are used to short the outputs of the I and Q baseband filters 334a and 334b.

Figure 4:
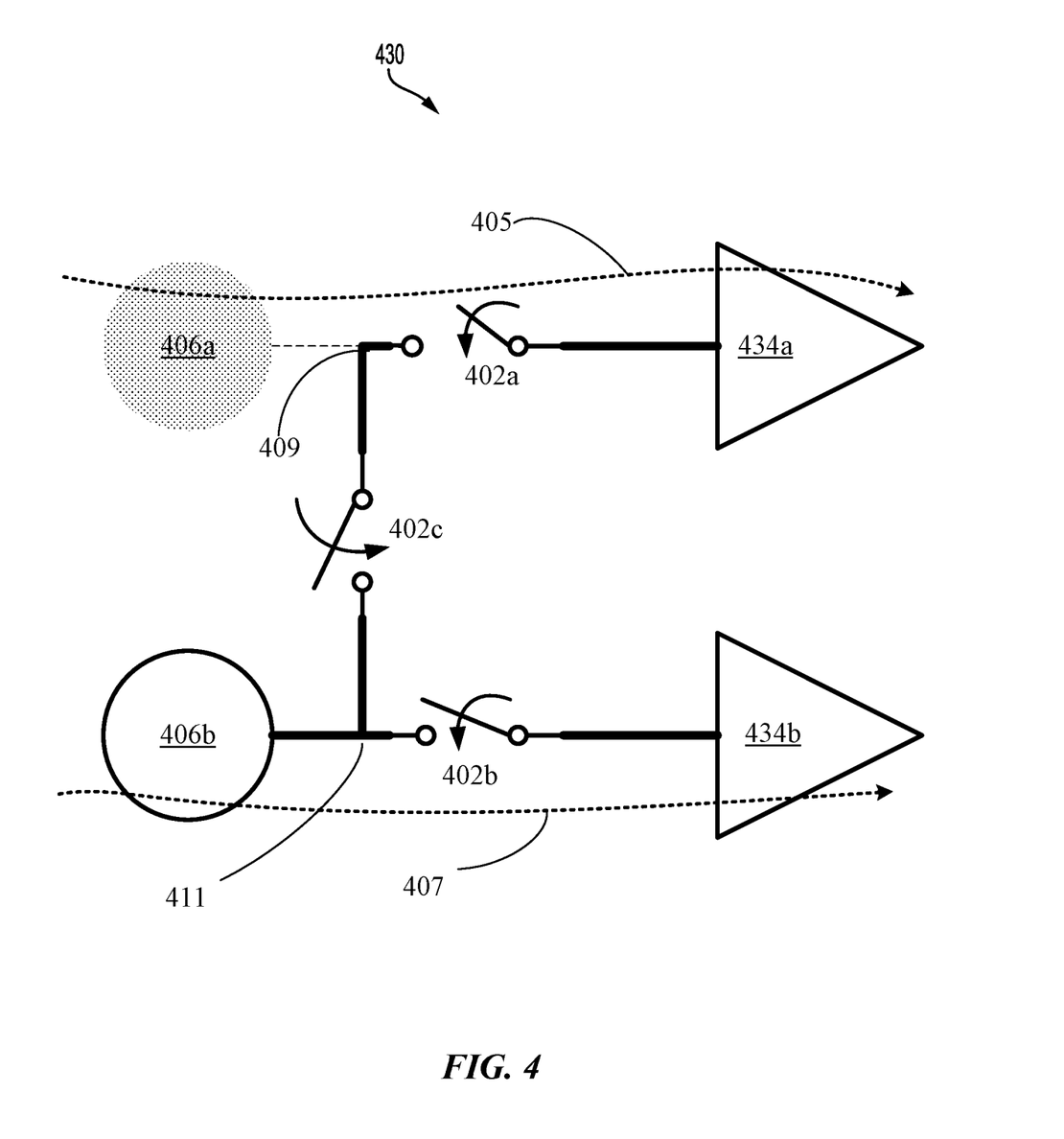
FIG. 4 shows a block diagram of an exemplary configuration of input and output switch matrices, according to aspects of the present disclosure.

FIG. 4 shows a block diagram of an exemplary design of a wireless transmitter 430 of a wireless device, according to aspects of the present disclosure. In-phase (I) and quadrature (Q) analog output signals are provided from a modem (e.g., the modem 310 of FIG. 3) to the wireless transmitter 430 via I and Q baseband filter input pillars 406a and 406b. Within the wireless transmitter 430, I and Q baseband filters 434a and 434b filter the in-phase (I) and quadrature (Q) analog transmit signals, respectively.

The wireless transmitter 430 shorts the I and Q baseband filter input pillars 406a and 406b directly through a switch configuration. For example, the switch configuration includes a first switch 402a between the I baseband filter input pillar 406a and the I baseband filter 434a of an I transmit signal path 405, a second switch 402b between the Q baseband filter input pillar 406b and the Q baseband filter 434b of a Q transmit signal path 407, and a third switch 402c between the I transmit signal path 405 and the Q transmit signal path 407. One terminal of the third switch 402c may be coupled to a node 409 between the I baseband filter input pillar 406a and the first switch 402a. Another terminal of the third switch 402c is coupled to another node 411 between the Q baseband filter input pillar 406b and the second switch 402b.

However, in the GSM/EDGE mode when the I-DAC has high impedance and does not drive any signal current, the signal current from the Q baseband filter input pillar 406b sees or is subject to two switches (e.g., the first switch 402a and the third switch 402c) in series toward an input of the I baseband filter 434a. The signal current from the Q baseband filter input pillar 406b sees or is subject to only one switch (e.g., the second switch 402b) toward an input of the Q baseband filter 434b. This impedance mismatch due to the mismatch in the switches causes more signal current to flow through the Q transmit signal path 407 causing large charge (e.g., voltage) swing differences between outputs of the I and Q baseband filters 434a and 434b.

Figure 5:
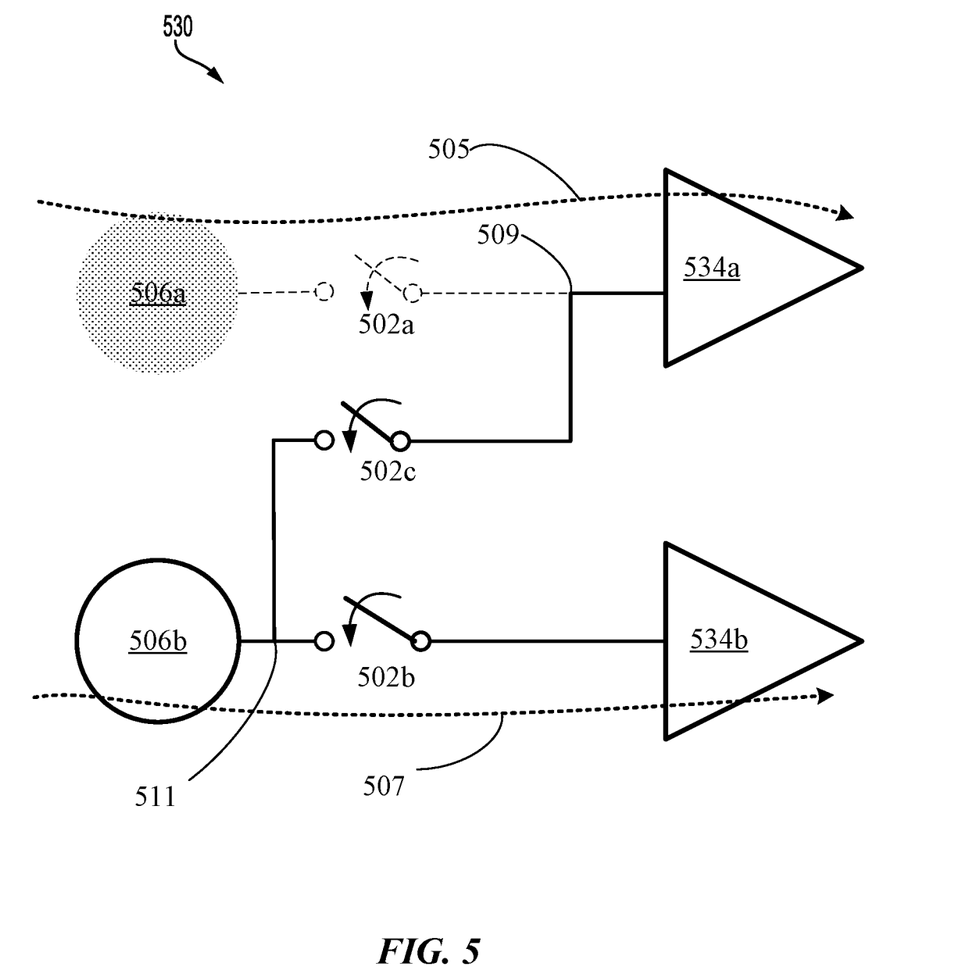
FIG. 5 shows a block diagram of an exemplary configuration of input and output switch matrices, according to aspects of the present disclosure.

FIG. 5 shows a block diagram of an exemplary design of a wireless transmitter 530 of a wireless device, according to aspects of the present disclosure. In-phase (I) and quadrature (Q) analog output signals are provided from a modem (e.g., the modem 310 of FIG. 3) to the wireless transmitter 530 via I and Q baseband filter input pillars 506a and 506b. Within the wireless transmitter 530, I and Q baseband filters 534a and 534b filter the in-phase (I) and quadrature (Q) analog transmit signals, respectively.

The switch configuration of the wireless transmitter 530 includes a first switch 502a between the I baseband filter input pillar 506a and the I baseband filter 534a of an I transmit signal path 505, a second switch 502b between the Q baseband filter input pillar 506b and the Q baseband filter 534b of a Q transmit signal path 507, and a third switch 502c (e.g., an IQ short switch) between the I transmit signal path 505 and the Q transmit signal path 507. For example, a first terminal of the third switch 502c is coupled to a node 509 between the first switch 502a and the I baseband filter 534a in the I transmit signal path 505. The first switch 502a is after the I baseband filter input pillar 506a. Another terminal of the third switch 502c is coupled to another node 511 between the Q baseband filter input pillar 506b and the second switch 502b.

The wireless transmitter 530 utilizes the impedance matched solution where the Q baseband filter input pillar 506b is shorted with an input of the I baseband filter 534a, instead of shorting the I and Q baseband filter input pillars 506a and 506b directly, as in the previous solution of FIG. 4. For example, in the GSM/EDGE mode when the I-DAC has high impedance and does not drive any signal current, signal current from the Q baseband filter input pillar 506b now sees only one switch impedance, from the third switch 502c, to each of the inputs of the I and Q baseband filters 534a and 534b. However, the Q baseband filter input pillar 506b in the impedance matched solution is subject to extra loading caused by the IQ short switch.

Figure 6:
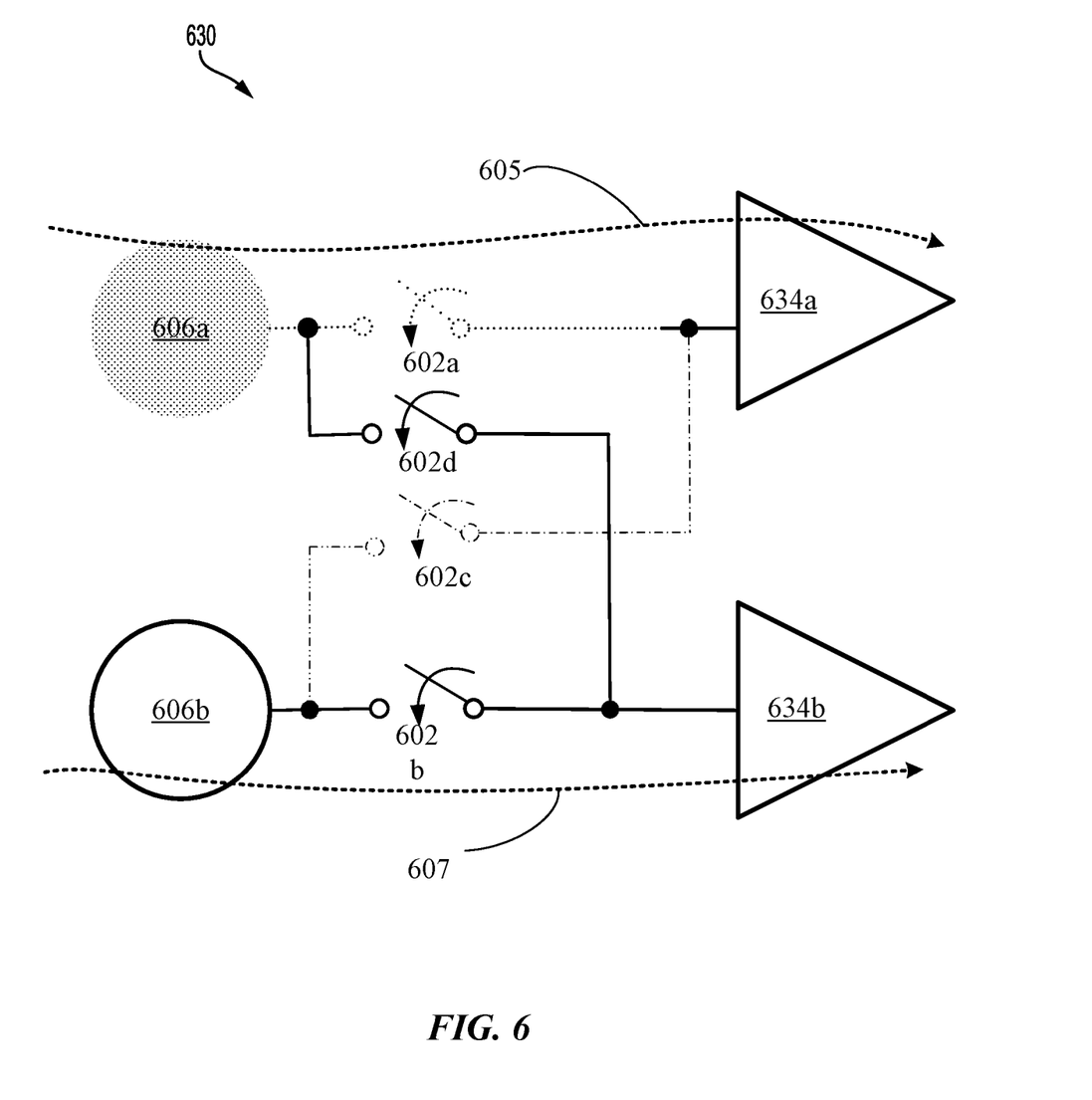
FIG. 6 shows a block diagram of an exemplary configuration of input and output switch matrices, according to aspects of the present disclosure.

FIG. 6 shows a block diagram of an exemplary design of a wireless transmitter 630 of a wireless device, according to aspects of the present disclosure. The wireless device includes a first transmit path (e.g., an I transmit signal path 605) and a second transmit path (e.g., a Q transmit signal path 607). The I transmit signal path 605 includes a first baseband filter 634a, and an I baseband filter input pillar 606a, which is coupled to an I-DAC (not shown). The I baseband filter input pillar 606a is coupled to an input of the first baseband filter 634a. The Q transmit signal path 607 includes a second baseband filter 634b, and a Q baseband filter input pillar 606b, which is coupled to a Q-DAC (not shown). The Q baseband filter input pillar 606*b* is coupled to an input of the second baseband filter 634*b*.

The wireless device also includes an input mode switch device coupled between the I baseband filter input pillar 606*a* and the input of the first baseband filter 634*a*. The output of the I-DAC corresponds to or is coupled to the I baseband filter input pillar 606*a*. The input mode switch device is also coupled between the Q baseband filter input pillar 606*b* and the input of the second baseband filter 634*b*. The output of the Q-DAC corresponds to or is coupled to the Q baseband filter input pillar 606*b*.

The input mode switch device includes a first switch 602*a*, a second switch 602*b*, a third switch 602*c*, and a fourth switch 602*d*. The first switch 602*a* is coupled between the I baseband filter input pillar 606*a* and the input of the first baseband filter 634*a*. The second switch 602*b* is coupled between the Q baseband filter input pillar 606*b* and the input of the second baseband filter 634*b*. The third switch 602*c* is coupled between the Q baseband filter input pillar 606*b* and the input of the first baseband filter 634*a*. The first switch 602*a*, the second switch 602*b*, and the third switch 602*c* are utilized to selectively couple the I baseband filter input pillar 606*a* and/or the Q baseband filter input pillar 606*b* to the first baseband filter 634*a* and/or the second baseband filter 634*b* based on the mode of operation.

The fourth switch 602*d* is coupled between the I baseband filter input pillar 606*a* and the input of the second baseband filter 634*b*. The fourth switch 602*d* is a dummy switch that is permanently open. For example, the dummy switch is always open and serves to match the loading of the I and Q baseband filter input pillars 606*a* and 606*b*. Thus, the dummy switch prevents flow of charge (voltage or current) between the I baseband filter input pillar 606*a* and the input of the second baseband filter 634*b*.

The inclusion of the dummy switch improves voltage swing differences at the outputs of the I and Q baseband filters 634*a* and 634*b* (e.g., when operating in accordance with the GSM/EDGE mode). The aspects of the present disclosure also improve loading in the Q baseband filter input pillar (e.g., when operating in accordance with the GSM/EDGE mode).

Figure 7:
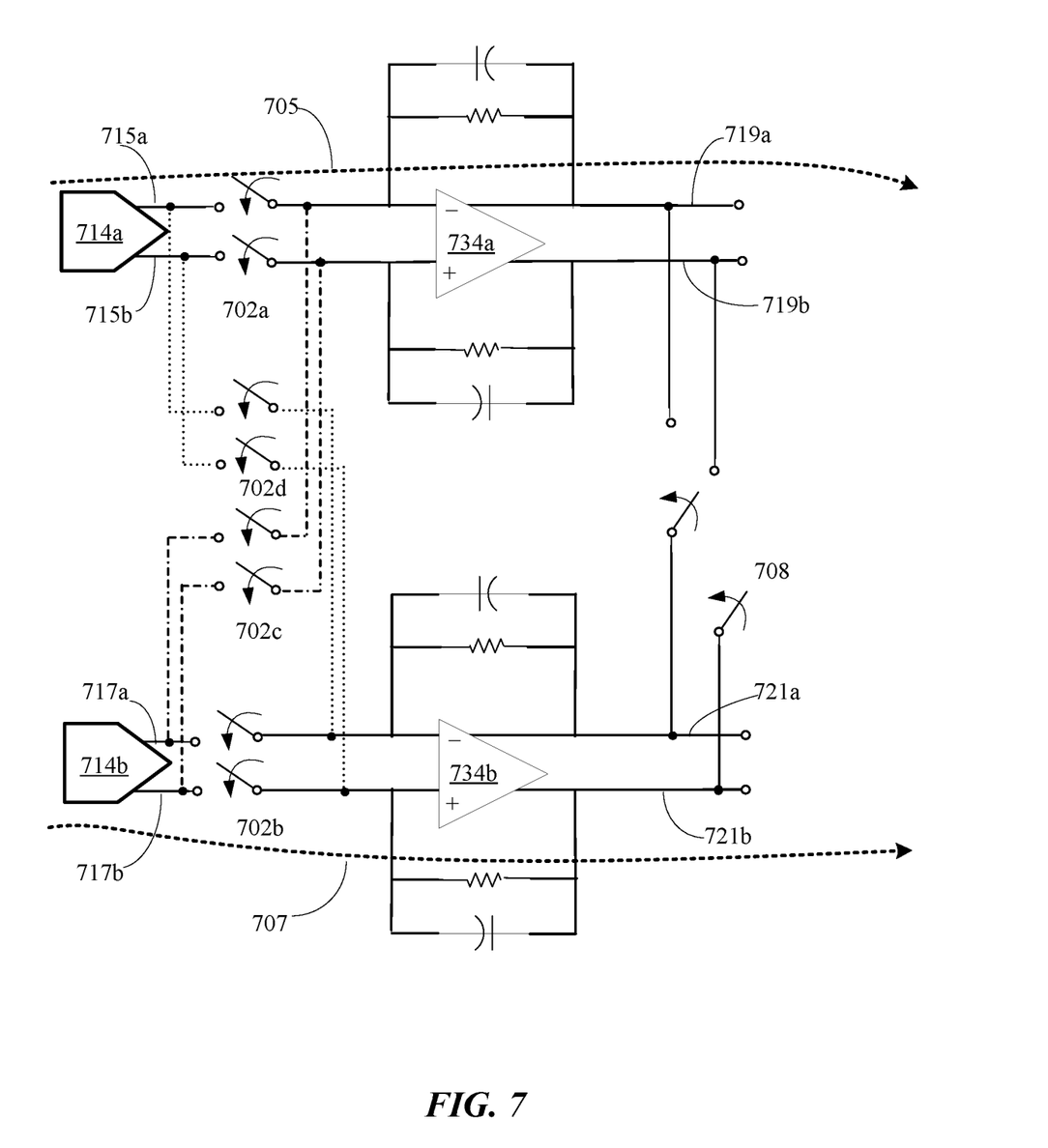
FIG. 7 shows a block diagram of an exemplary configuration of input and output switch matrices, according to aspects of the present disclosure.

FIG. 7 shows a block diagram of an exemplary design of a wireless transmitter 730 of a wireless device, according to aspects of the present disclosure. The wireless transmitter 730 includes a first differential transmit path (e.g., an I differential transmit signal path 705) and a second differential transmit path (e.g., a Q differential transmit signal path 707).

The I differential transmit signal path 705 includes a first baseband filter 734*a*, and an I-DAC 714*a* coupled to an input of the first baseband filter 734*a*. The Q differential transmit signal path 707 includes a second baseband filter 734*b* and a Q-DAC 714*b* coupled to an input of the second baseband filter 734*b*. The outputs of the I-DAC 714*a* and the Q-DAC 714*b* are differential outputs. For example, the differential output of the I-DAC 714*a* includes a first output signal 715*a* and a second output signal 715*b*. The differential output of the Q-DAC 714*b* includes a first output signal 717*a* and a second output signal 717*b*.

The outputs of the first baseband filter 734*a* and the second baseband filter 734*b* are differential outputs. For example, the differential output of the first baseband filter 734*a* includes a first output signal 719*a* and a second output signal 719*b*. The differential output of the second baseband filter 734*b* includes a first output signal 721*a* and a second output signal 721*b*.

The wireless transmitter 730 includes an input mode switch device coupled between the I-DAC 714*a* and the input of the first baseband filter 734*a*. The input mode switch device is also coupled between the Q-DAC 714*b* and the input of the second baseband filter 734*b*. The input mode switch device includes a first differential switch 702*a*, a second differential switch 702*b*, a third differential switch 702*c*, and a fourth differential switch 702*d*. The first differential switch 702*a* is coupled between the I-DAC 714*a* and the input of the first baseband filter 734*a*. The second differential switch 702*b* is coupled between the Q-DAC 714*b* and the input of the second baseband filter 734*b*. The third differential switch 702*c* is coupled between the Q-DAC 714*b* and the input of the first baseband filter 734*a*.

The first differential switch 702*a*, the second differential switch 702*b*, and the third differential switch 702*c* selectively couple the I-DAC 714*a* and/or the Q-DAC 714*b* to the first baseband filter 734*a* and/or the second baseband filter 734*b* based on the mode of operation. For example, the differential output signal of the I-DAC 714*a* is selectively coupled to the first baseband filter 734*a* via the first differential switch 702*a* in the LTE mode of operation. Similarly, the differential output signal of the Q-DAC 714*b* is selectively coupled to the second baseband filter 734*b* via the second differential switch 702*b* in the LTE mode of operation. In the LTE mode of operation, the third differential switch 702*c* is disabled and/or opened while the first differential switch 702*a* and the second differential switch 702*b* are enabled and/or closed. In the GSM/EDGE mode, however, the first differential switch 702*a* is disabled or opened while the second differential switch 702*b* and the third differential switch 702*c* are enabled and/or closed.

The fourth differential switch 702*d* is coupled between the I-DAC 714*a* and the input of the second baseband filter 734*b*. The fourth differential switch 702*d* is a dummy switch that is permanently open. The dummy switch prevents flow of charge (voltage or current) between the I-DAC 714*a* and the input of the second baseband filter 734*b*.

The use of the dummy switch improves, reduces, or eliminates impedance mismatch of the load of the I and Q baseband filter inputs or the load of the I-DAC and Q-DAC due to the mismatch in the switches. However, even when the I and Q baseband filters are impedance matched, mismatches between the I and Q operational amplifiers of the I and Q baseband filters (e.g., the first baseband filter 734*a* and the second baseband filter 734*b*) cause the input impedances to vary considerably, resulting in swing mismatches at the output of the first baseband filter 734*a* and the second baseband filter 734*b*.

To reduce the mismatches between the first baseband filter 734*a* and the second baseband filter 734*b*, an output mode switch device (e.g., a differential output mode switch 708) is used to short the outputs of the first baseband filter 734*a* and the second baseband filter 734*b*. Although not shown, a non-differential output node switch can be used for non-differential signals in non-differential transmit paths. The differential output mode switch 708 is enabled only in the GSM/EDGE mode. The output mode switch device equalizes the loading at the outputs of the first baseband filter 734*a* and the second baseband filter 734*b* while optimizing available space for the placement of the switches.

Figure 8:
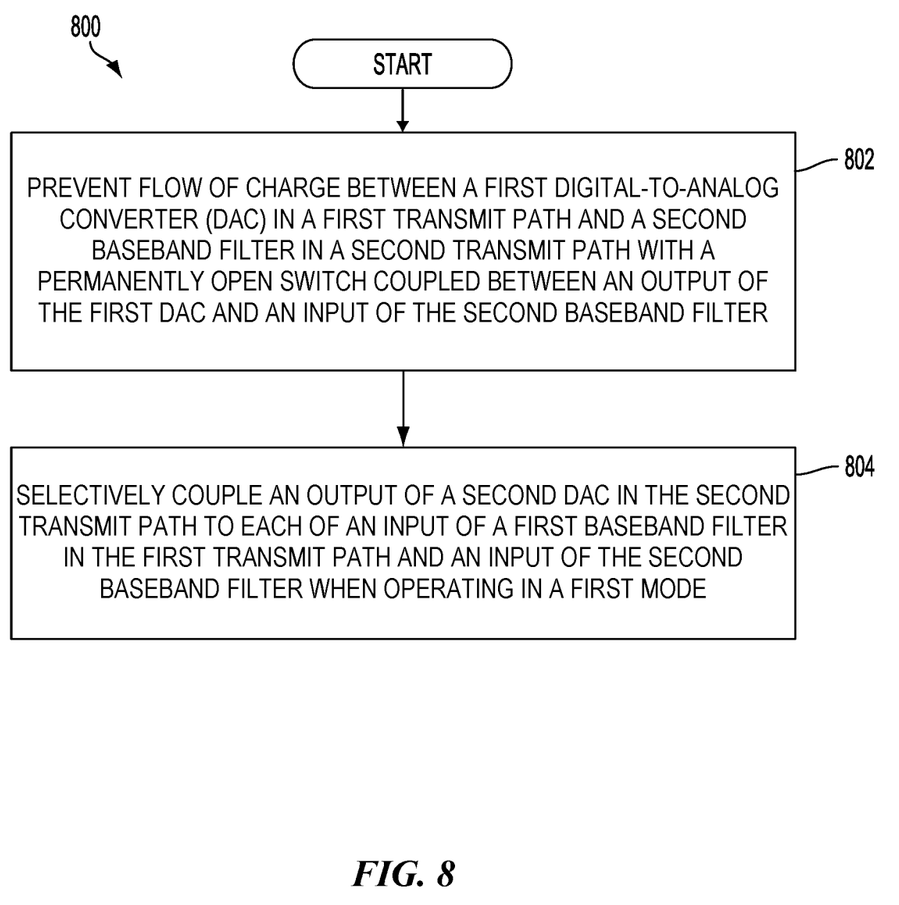
FIG. 8 depicts a simplified flowchart of a method for reducing impedance mismatch in a transmit path of wireless communications device according to aspects of the present disclosure.

FIG. 8 depicts a simplified flowchart of a method 800 for reducing impedance mismatch in a transmit path of wireless communications device. At block 802, a permanently open switch coupled between an output of a first DAC (digital-to-analog converter) in a first transmit path and an input of a second baseband filter in a second transmit path prevents flow of charge (current or voltage) between the first DAC and the second baseband filter. At block 804, a switch matrix between the first DAC and a first baseband filter in the first transmit path and between a second DAC in the second transmit path and the second baseband filter is used to selectively couple an output of a second DAC to each of an input of the first baseband filter and the second baseband filter when operating in a first mode.

According to one aspect of the present disclosure, a device is described. The device includes first means for switching, second means for switching, third means for switch, and fourth means for switching. The first switching means may, for example, be the switch 602a. The second switching means may, for example, be the switch 602d. The third switching means may, for example, be the switch 602b. The fourth switching means may, for example, be the switch 602dc. In another aspect, the aforementioned means may be any module or any apparatus or material configured to perform the functions recited by the aforementioned means.

FIG. 9 is a block diagram showing an exemplary wireless communications system in which a configuration of the disclosure may be advantageously employed. For purposes of illustration, FIG. 9 shows three remote units 920, 930, and 950 and two base stations 940. It will be recognized that wireless communications systems may have many more remote units and base stations. Remote units 920, 930, and 950 include IC devices 925A, 925B, and 925C that include the disclosed impedance matching implementation or device. It will be recognized that other devices may also include the disclosed impedance matching implementation or device, such as the base stations, switching devices, and network equipment. FIG. 9 shows forward link signals 980 from the base station 940 to the remote units 920, 930, and 950 and reverse link signals 990 from the remote units 920, 930, and 950 to base station 940.

In FIG. 9, remote unit 920 is shown as a mobile telephone, remote unit 930 is shown as a portable computer, and remote unit 950 is shown as a fixed location remote unit in a wireless local loop system. For example, a remote unit may be a mobile phone, a hand-held personal communications systems (PCS) unit, a portable data unit such as a personal digital assistant (PDA), a GPS enabled device, a navigation device, a set top box, a music player, a video player, an entertainment unit, a fixed location data unit such as a meter reading equipment, or other communications device that stores or retrieves data or computer instructions, or combinations thereof. Although FIG. 9 illustrates remote units according to the aspects of the disclosure, the disclosure is not limited to these exemplary illustrated units. Aspects of the disclosure may be suitably employed in many devices, which include the impedance matching implementation or device.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

Although the present disclosure and its advantages have been described in detail, it should be understood that various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, and composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

What is claimed is:

1. A device comprising:
 a first switch in a first transmit path coupled between an output of a first DAC (digital-to-analog converter) in the first transmit path and an input of a first baseband filter in the first transmit path;
 a second switch coupled between the output of the first DAC and an input of a second baseband filter in a second transmit path, the second switch being permanently open;
 a third switch coupled between an output of a second DAC in the second transmit path and the input of the second baseband filter, and
 a fourth switch coupled between the output of the second DAC and the input of the first baseband filter.

2. The device of claim 1, in which the first DAC comprises an in-phase DAC and the first baseband filter comprises an in-phase baseband filter.

3. The device of claim 1, in which the second DAC comprises a quadrature DAC and the second baseband filter comprises a quadrature baseband filter.

4. The device of claim 1, in which each of the output of the first DAC and the output of the second DAC comprises differential outputs and each of the input and output of the first baseband filter and the second baseband filter comprises differential inputs.

5. The device of claim 4, in which each of the first switch, the second switch, the third switch, and the fourth switch comprise dual switches for the differential inputs and the differential outputs.

6. The device of claim 1, further comprising a fifth switch coupled between an output of the first baseband filter and an output of the second baseband filter.

7. A device comprising:
 a first transmit path comprising:
  a first baseband filter, and
  a first DAC (digital to analog converter) coupled to an input of the first baseband filter;
 a second transmit path comprising:
  a second baseband filter, and
  a second DAC coupled to an input of the second baseband filter; and
 a mode switch device coupled between an output of the first DAC and the input of the first baseband filter and between an output of the second DAC and the input of the second baseband filter, the mode switch device comprising:
  a first switch coupled between the output of the first DAC and the input of the first baseband filter;
  a second switch coupled between the output of the first DAC and the input of the second baseband filter, the second switch being permanently open;
  a third switch coupled between the output of the second DAC and the input of the second baseband filter, and
  a fourth switch coupled between the output of the second DAC and the input of the first baseband filter.

8. The device of claim 7, in which the first DAC comprises an in-phase DAC and the first baseband filter comprises an in-phase baseband filter.

9. The device of claim 7, in which the second DAC comprises a quadrature DAC and the second baseband filter comprises a quadrature baseband filter.

10. The device of claim 7, in which each of the output of the first DAC and the output of the second DAC comprises differential outputs and each of the input and output of the first baseband filter and the second baseband filter comprises differential inputs.

11. The device of claim 10, in which each of the first switch, the second switch, the third switch, and the fourth switch comprise dual switches for the differential inputs and the differential outputs.

12. The device of claim 7, further comprising a fifth switch coupled between an output of the first baseband filter and an output of the second baseband filter.

* * * * *